United States Patent

Clark

[15] 3,705,315

[45] Dec. 5, 1972

[54] FRAME SYNCHRONIZATION SYSTEM

[72] Inventor: James M. Clark, Cedar Grove, N.J.

[73] Assignee: International Telephone and Telegraph Corporation, Nutley, N.J.

[22] Filed: Nov. 1, 1971

[21] Appl. No.: 194,596

Related U.S. Application Data

[63] Continuation of Ser. No. 31,337, April 23, 1970, abandoned.

[52] U.S. Cl. ..........307/269, 178/69.5 R, 179/15 BS, 328/63, 328/72, 328/155

[51] Int. Cl. ..............................H03k 5/13, H041 7/00

[58] Field of Search.....178/69.5 R; 307/269; 328/63, 328/72, 155; 179/15 BS

[56] References Cited

UNITED STATES PATENTS

| | | | |
|---|---|---|---|
| 3,505,606 | 4/1970 | Werner | 307/304 X |
| 3,441,342 | 4/1969 | Ball et al. | 352/17 |
| 3,057,962 | 10/1962 | Mann et al. | 179/15 |
| 3,479,603 | 11/1969 | Overstreet, Jr. | 328/61 |
| 3,521,172 | 7/1970 | Harmon | 328/133 |
| 3,597,539 | 8/1971 | Clark | 307/269 |

*Primary Examiner*—Herman Karl Saalbach
*Assistant Examiner*—R. C. Woodbridge
*Attorney*—C. Cornell Remsen, Jr. et al.

[57] ABSTRACT

There is disclosed a framing control circuit for a frame synchronization system. The circuit includes a sense circuit having a first integrator with a relatively long time constant and a first amplitude comparator to detect an out-of-synchronization condition, and a search circuit having a second integrator with a relatively short time constant, a second amplitude comparator and a third amplitude comparator to detect an in-synchronization condition. The third amplitude comparator produces a high output and a mode flip flop having its "1" input coupled to the first comparator produces a high output on its "1" output when an out-of-synchronization condition is present. The simultaneous presence of these two signals activates the search logic of the frame synchronization system. The "0" input of the flip flop is coupled to the second comparator and produces a high output on its "0" output when an in-synchronization condition is present. A diode is coupled between the "0" of output of flip flop and the input of the first integrator, said diode being rendered conductive when the "0" output is low. This diode conduction will reset the first integrator to a reference operating level which ensures full use of the time constant thereof and, hence, better protection against accidental phase shift (loss of synchronization) due to a short fade.

5 Claims, 2 Drawing Figures

INVENTOR
JAMES M. CLARK
BY
Alfred C. Hill
AGENT

FRAME SYNCHRONIZATION SYSTEM

CROSS-REFERENCE TO RELATED APPLICATIONS

This is a continuation of application Ser. No. 31,337 filed Apr. 23, 1970 now abandoned.

BACKGROUND OF THE INVENTION

This invention relates to digital communication systems, such as time division digital multiplexers including pulse code modulation (PCM) equipment, and more particularly to the framing control circuit for frame synchronization systems employed therein.

The general problem is to establish and maintain frame synchronization of a digital communication link in the presence of noise or bit errors. A frame synchronization system controls the timing counters of a digital multiplexer to make the counter timing synchronous with the format of the received data. This system has two primary functions: (1) to sense when synchronization is lost and (2) to change the phase of the counters, as required, until synchronization is achieved. A reference synchronization pattern generated by the counters is compared with the incoming signal to detect whether or not the counters are synchronized. If synchronization is lost, the equipment will switch to a search mode. In the search mode, the phase of the counters are changed until it is detected that synchronism is achieved after which the frame synchronization system will change to a sense mode to detect a subsequent loss of synchronization.

As mentioned hereinabove the frame synchronization system operates in two modes. In the sense mode, it is assumed that the phase of the counters has been correct, and the decision circuit must detect whether the frame is now incorrect (loss of synchronization). In the search mode, it is assumed that the frame phase has been incorrect and adjustment of the phase is made. The decision circuit must decide whether the frame phase is now correct. Both modes must be considered in the design of the decision circuit.

For the sense mode, it is often required that the response of the decision circuit must be slow. This guards against signal fading such as encountered in tropospheric scatter radio communications. Fading of the received signal commonly causes the mismatch rate to exceed the threshold probability. This causes the decision circuit to decide that the frame phase is incorrect, when indeed it is correct. This activates the framing or search logic to search, that is, adjust the phase, and the first adjustment will make the phase incorrect. If, however, the response of the betting circuit is slow compared to the duration of a fade, the fade will cease before an erroneous decision can be made.

For the search mode, it is typically required that the response of the decision circuit must be fast. This is an important factor in reducing the average search time (time to acquire synchronization), since the decision circuit makes many decisions during a search.

One type of decision circuit, referred to as a simple or single decision circuit, is illustrated in FIG. 5 of a first copending application of J. M. Clark, Ser. No. 781,181, filed Dec. 4, 1968, now U. S. Pat. No. 3,597,539 whose disclosure is incorporated herein by reference. The conflicting (but not contradicting) requirements that the response of the decision circuit must be slow for sense mode and fast for search mode means that it must take a long time for the output voltage E1 of the differential amplifier of this prior art arrangement to decrease from its upper limit to a decision level voltage V3, and a short time for output voltage E1 to increase from its lower limit to voltage V3. To satisfy both requirements, voltage V3 must be much closer to the lower limit voltage than the upper limit voltage and the threshold voltage V1 applied to the differential amplifier must be set as low as possible, making the threshold probability as close as possible to the lowest mismatched rate expected for an incorrect phase. However, consideration of component variations and power supply variations that might cause voltage V1, V3 or the clamp voltage to change with time or temperature place a limit on how closely V1 and V3 may be set without making a functional failure possible. The result is that in some cases, a simple decision circuit as disclosed in FIG. 5 of said first copending application cannot satisfy both of the stated requirements.

To overcome this disadvantage of a simple decision circuit, it has been the practice in the past of providing a dual decision or framing control circuit employing two integrators; one integrator for the sense mode and the other integrator for the search mode. The reason for this is that the sense mode requires a long time constant to render the framing control circuit insensitive to input signal fading and the search mode requires a short time constant to enable fast acquisition of synchronization. It has been noted, however, that this type of circuit incorporates a disadvantage in that the sense circuit is slower than the search circuit and, thus, the output voltage E1 of the sense circuit cannot go up as fast as the output voltage of the search circuit E2. Thus, there is a possibility that soon after acquiring synchronization, when the output voltage E1 is low and not yet up to the upper limit voltage (reference operating voltage), that a short fade can make the framing circuit lose synchronization, because the output voltage E1 is lower than the reference operating voltage and effectively makes the response time of the sense circuit shorter than normal.

SUMMARY OF THE INVENTION

An object of this invention is to provide a dual decision circuit which will overcome the disadvantage of the prior art dual decision circuit.

Another object of this invention is to provide a dual decision circuit for a frame synchronization system which employs a sense integrator and a search integrator whereby the sense integrator is reset to a reference operating level when the dual decision circuit is in the search mode to ensure full use of the time constant thereof and, hence, better protection against accidental phase shift (loss of synchronization) due to a short fade.

A feature of this invention is the provision of a frame synchronization system comprising a source of binary information signal having a given bit rate and containing a synchronization component; first means to produce a plurality of timing signals; second means coupled to the source and the first means to examine successive bits of the information signal to recognize the synchronization component and produces a resultant output signal at each examination indicating either an in-synchronization condition or an out-of-synchronization condition; logic circuitry coupled to the first and second means; and a dual decision circuit coupled between the second means and the logic circuitry producing a pair of control signals to activate the logic circuitry, when the resultant output signal and both said pair of control signals indicate an out-of-synchronization condition, for timing adjustment of the timing signals to achieve frame synchronization; the dual decision circuit including third means having a first, relatively long time constant and a reference operating level; fourth means having a second, relatively short time constant producing one of the pair of control signals; and fifth means coupled to the first and second means to produce the other of the pair of control signals and to reset the first means to the reference operating level when the other of the pair of control signals indicate an out-of-synchronization condition.

Another feature of this invention is the provision of a dual decision circuit to provide a pair of control signals each having a first condition when an input signal is in a first condition for a first predetermined length of time and a second condition when the input signal is in a second condition for a second predetermined length of time different than the first predetermined length of time comprising a first source of the input signal; first means coupled to the first source having a first, relatively long time constant equal to the first predetermined length of time and a reference operating level; second means coupled to the first source having a second, relatively short time constant producing one of the pair of control signals; and third means coupled to the first and second means to produce the other of the pair of the control signals and to reset the first means to the reference operating level when the other of the pair of control signals is in the first condition.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENT

Figure 1:
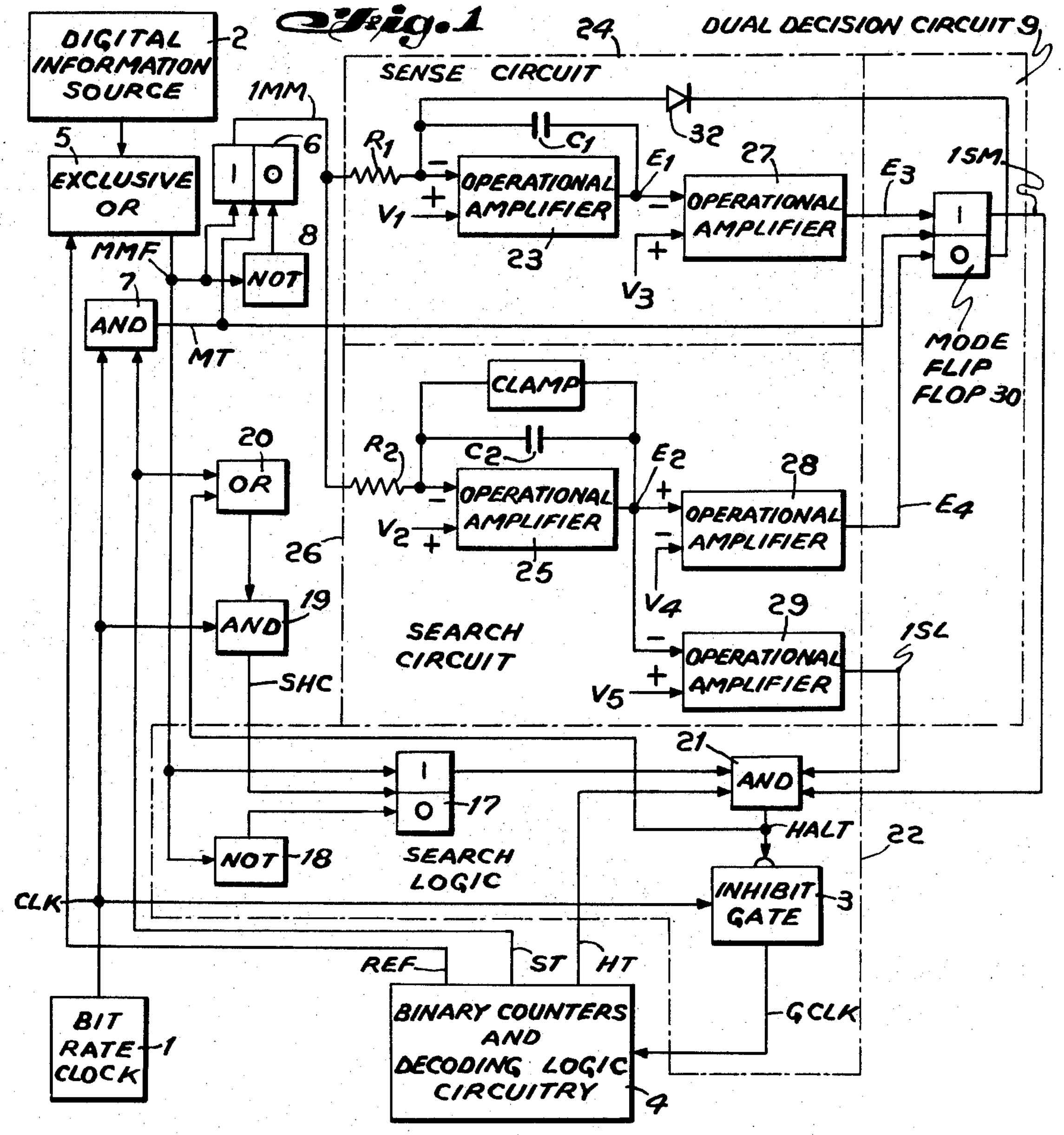
FIG. 1 is a block diagram of a frame synchronization system incorporating a dual decision circuit as the framing control circuit for a frame synchronization system in accordance with the principles of the present invention.

Referring to FIG. 1, there is illustrated therein a block diagram of one embodiment of a frame synchronization system similar to that disclosed in said first copending application incorporating the dual decision circuit of the present invention. Clock 1 produces clock pulses at the bit rate of the digital (binary) information signal from source 2 and is applied through INHIBIT gate 3 to binary counters and decoding logic circuitry 4 to produce various timing signals necessary for the operation of the frame synchronization system, as well as timing signals necessary for other functions, such as demultiplexing the multiplexed signal received from source 2. For purposes of explanation, it will be assumed that the frame rate of the information signal is 8 KHz (kilohertz), that the received one bit distributed synchronization code has the pattern in adjacent frames of 1, 0, and that the local synchronization reference signal referred to as REF is a 4 KHz square wave. Other timing signals generated by circuitry 4 are the synchronization bit time signal ST having a constant width of one clock period and the halt time signal HT having a varying width equal to the width of the HALT pulse plus the width of one clock period. The timing signals REF, ST and HT produced by circuit 4 are identical to the timing signals REF, ST and HT produced by circuitry 6 of U. S. Pat. No. 3,597,539. FIGS. 8–12 of U. S. Pat. No. 3,597,539 illustrate the waveform and timing relationship of timing signals ST and HT with respect to each other under various conditions of in-synchronization and out-of-synchronization conditions and other timing signals of FIG. 4 of U. S. Pat. No. 3,597,539 which are identical to the timing signals of FIG. 1 herein. The disclosure of U. S. Pat. No. 3,597,539 is incorporated herein by reference and particularly FIGS. 8–12 thereof and the associated description.

The need for the signal HT is to prevent the frame synchronization system from locking in an unsynchronized and stationary condition upon power turn-on, since components 6, 9 and 17 could otherwise assume a combination of states that would stop the counters of circuitry 4. The lack of timing signals could prevent flip flops 6 and 17 from leaving the above combination of states. By utilizing the signal HT the counters of circuitry 4 are allowed to stop only when timing signals are available to flip flops 6 and 17.

The information signal from source 2 and the local synchronization reference signal REF from circuitry 4 are applied to a digital comparison means in the form of an EXCLUSIVE OR gate 5 which compares the binary conditions of the successive bits of the information signal and the REF signal to determine the presence of the assumed distributed synchronization code. Gate 5 will produce a resultant output signal which indicates a match or a mismatch between the binary conditions of the two input signals applied thereto. The resultant output signal has been designated the MMF signal. The MMF signal is applied directly to flip flop 6. Flip flop 6 is triggered by the MT signal at the output of AND 7 to sample the MMF signal. AND 7 has its inputs coupled to clock 1 and the ST signal output from circuitry 4. The signal from gate 5 will be sampled by the leading edge of the MT signal and the state of flip flop 6 will be changed on the trailing edge of the MT signal for the type of flip flop assumed for illustration. Thus, if the MMF signal is a binary "1," representative of a mismatch, the output from flip flop 6 will be changed to a binary "1" in time coincidence with the trailing edge of the MT signal. This output from flip flop 6 is designated 1MM. The output from gate 5 is also coupled to NOT 8. Thus, when the MMF signal is "0," representative of a match, the output of NOT 8 will be a "1" which will be sampled at the leading edge of the MT signal and at its trailing edge will cause flip flop 6 to change its state, thus, producing on its "1" output a binary "0" condition.

The output from flip flop 6 is connected to dual decision circuit 9 which determines whether the samples presented thereto indicate a synchronized or unsynchronized condition.

The output from gate 5 is also coupled to flip flop 17 directly and through NOT 18. The triggering pulses for flip flop 17 are provided from AND 19 and OR 20. The input to OR 20 is the ST signal from circuitry 4 and the output of AND 21 whose operation will be explained hereinbelow. The inputs to AND 19 is the output from OR 20 and the output from clock 1, thereby, generating a SHC trigger signal for flip flop 17. AND 21 determines whether a HALT pulse should be coupled to the inhibit terminal of INHIBIT 3 to change the phase of the timing signals at the output of circuitry 4 by momentarily halting the counting of the binary counters. AND 21 receives the SL (search level) output of decision circuit 9, the output of flip flop 17 and the SM (search mode) output of decision circuit 9. Also, the HT signal from circuitry 4 is coupled to AND 21 and has the purpose as hereinabove mentioned. Thus, when any of the input signals to AND 21 are in a "0" condition there is no HALT or inhibit signal produced and the counters of circuitry 4 will count normally without interruption. The lack of a HALT or inhibit signal indicates a synchronized condition. When all the input signals to AND 21 are in the "1" condition, AND 21 will produce a HALT pulse which will inhibit gate 3, thus, stopping the counting action of the counters of circuitry 4 and resulting in a shift of the phase or timing of the timing signals produced by circuitry 4. The presence of a HALT or inhibit signal indicates an out-of-synchronization condition. The amount of phase shift is dependent upon how many clock pulses are inhibited as is fully explained in said first copending application.

In the above description flip flop 17, NOT 18, AND 21 and gate 3 comprise search logic 22 which is fully described in said first copending application. An alternative arrangement to search logic 22 which can be employed in the system disclosed herein, is fully disclosed in a second copending application of J.M. Clark, Ser. No. 780,981, filed Dec. 4, 1968, now U.S. Pat. No. 3,594,502 including an $(N+1)$ stage shift register. The disclosure of U. S. Pat. No. 3,594,502 is incorporated herein by reference.

As assumed hereinabove the synchronizating code signal present in the information from source 2 included a one bit distributed synchronizing code signal with which a digital comparator, such as EXCLUSIVE OR 5, will operate. However, there are other types of synchronizing code signals that can be employed which will require different types of digital comparators. These different synchronizing code signals and digital comparators can be employed in the frame synchronization of the present application employing either of the search logics mentioned hereinabove. When a lumped type synchronizing code signal is employed, the digital comparator may take the form similar to that disclosed in FIG. 13 of said first copending application and FIG. 11 of said second copending application. When a combined lumped and distributed type synchronizing code signal is employed, the digital comparator may take the form similar to that disclosed in FIG. 14 of said first copending application and FIG. 12 of said second copending application.

There is illustrated in the block labeled dual decision circuit 9 a block diagram of the components employed therein in accordance with the principles of this invention to overcome the disadvantage pointed out hereinabove under the heading of "Background of the Invention" for previously employed dual decision circuits. Dual decision circuit 9 is a dual integrator or betting circuit. The input 1MM from flip flop 6 is coupled to two integrator circuits. The integrator composed of operational amplifier 23, resistor R1 and capacitor C1 is in the sense circuit 24 and the integrator composed of operational amplifier 25, resistor R2 and capacitor C2 is in the search circuit 26. The time constant R1, C1 is made large to increase the sense mode response time, and the time constant R2, C2 is made small to decrease the search mode response time. Operational amplifier 27 provides a voltage or amplitude comparator for sense circuit 24 and operational amplifiers 28 and 29 provide voltage or amplitude comparators for search circuit 26. Amplifiers 27 and 28 are arranged as shown to set and reset mode flip flop 30 as follows.

Figure 2:
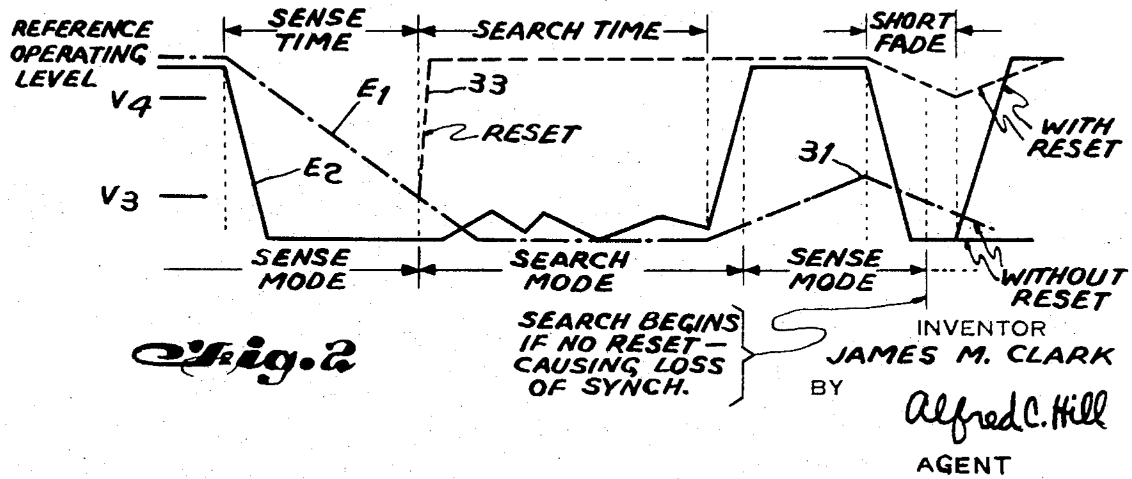
FIG. 2 is a graphical representation of various voltages in the dual decision circuit of FIG. 1 useful in explaining the operation thereof.

When synchronization is lost, the average mismatch rate exceeds the threshold probability set by bias voltage V1, voltage E1 goes down more than up, and eventually voltage E1 becomes less than bias voltage V3, causing voltage E3 to become high and setting mode flip flop 30 to provide a "1" at the "1" output thereof. This is illustrated in FIG. 2 by dot-dash curve E1. The output signal SM is equal to "1," representing a search mode, and enables searching to begin provided there is a "1" on the SL output of amplifier 29 in search circuit 26. Since search circuit 26 has a smaller time constant, voltage E2 will go down faster and sooner than voltages E1 and the SL output of amplifier 29 will become "1" before signal SM becomes "1". Note relative slope of curves E2 and E1 of FIG. 2. Since both output signals SL and SM are required to enable searching the slower circuit, namely, sense circuit 24, determines the sense time, or the time for response to a loss of synchronization.

During the search for the correct phase, the integrator and amplifier 29 of search circuit 26 operate in a manner similar to a simple decision circuit of the prior art, such as disclosed in said first copending application. When the frame phase is correct, the average mismatch rate is less than the threshold probability set by bias voltage V2, E2 goes up more than down, and eventually E2 becomes higher than voltage V4, causing voltage E4 to become high and reset mode flip flop 30 to "0," which represents the sense mode.

Since the sense circuit is slower, voltage E1 cannot go up as fast as voltage E2, and there is a possibility that soon after acquiring synchronization, when voltage E1 is low, as indicated at point 31 of FIG. 2, and not yet up to the reference operating level, that a short fade can make the framing circuit lose synchronization, because voltage E1 being low will make the response time of sense circuit 24 shorter than normal. To avoid this problem, the "0" output of flip flop 30 is coupled back to the negative or inverting input of amplifier 23 through diode 32. During sense mode, the "0" output of flip flop 30 is high, reverse biasing diode 32, and having no effect on sense circuit 24. During search mode, when sense circuit 24 is not being used, the "0" output of flip flop 30 is low, forward biasing diode 32, and drawing current from the inverting input of amplifier 23. The low source impedance of this signal enables voltage E1 to be rapidly set to its upper voltage limit or reference operating level as illustrated by dashed line 33 of FIG. 2.

By clocking flip flop 30 with the frame timing signal MT, flip flop 30 will change state synchronously with the counters. However, the timing signal MT is necessary only if the type of flip flop used requires a clock pulse.

Thus, according to the present invention the sense circuit 24 of the dual decision circuit 9 is reset to a reference operating level during search time to overcome the disadvantage of the prior art dual decision circuits described hereinabove under the heading "-Background of the Invention" which ensures full use of the time constant of sense circuit 24 and, hence, better protection against accidental phase shift (loss of synchronization) due to a short fade.

While I have described above the principles of my invention in connection with specific apparatus, it is to be clearly understood that this description is made only by way of example.

I CLAIM:

1. A frame synchronization system comprising:
a source of binary information signal having a given bit rate and containing a synchronization component;
first means to produce a plurality of timing signals;
second means coupled to said source and said first means to examine successive bits of said information signal to recognize said synchronization component and produce a resultant output signal at each examination indicating either an in-synchronization condition or an out-of-synchronization condition;
logic circuitry coupled to said first and second means; and
a dual decision circuit coupled between said second means and said logic circuitry producing a pair of control signals to activate said logic circuitry, when said resultant output signal and both said pair of control signals indicate an out-of-synchronization condition, for timing adjustment of said timing signals to achieve frame synchronization;
said dual decision circuit including
third means having a first, relatively long time constant and a reference operating level,
fourth means having a second, relatively short time constant producing one of said pair of control signals, and
fifth means coupled to said third and fourth means to produce the other of said pair of control signals and to reset said third means to said reference operating level when said other of said pair of control signals indicates an out-of-synchronization condition.

2. A system according to claim 1, wherein
said first means further produces
a local binary synchronization reference signal; and
said second means includes
digital comparison means coupled to said source and said first means to compare the binary condition of successive bits of said information signal and the binary condition of said reference signal and produce said resultant output signal.

3. A system according to claim 1, wherein
said third means includes
a first integrator coupled to said second means having said first time constant and said reference operating level,
a first amplitude comparator coupled to the output of said first integrator;
said fourth means includes
a second integrator coupled to said second means having said second time constant,
a second amplitude comparator coupled to the output of said second integrator to produce said one of said pair of control signals, and
a third amplitude comparator coupled to the output of said second integrator; and
said fifth means includes
a bistable means coupled to the output of said first and third comparators to produce said other of said pair of control signals, and
a unidirectional device coupled between the output of said bistable means and the input of said first integrator to reset said first integrator to said reference operating level when said other of said pair of control signals indicates an out-of-synchronization condition.

4. A system according to claim 3, wherein
said bistable means includes
a flip flop having its "1" input coupled to the output of said first comparator, its "0" input coupled to the output of said third comparator and its "1" output producing said other of said pair of control signals; and said unidirectional device including
a diode coupled between the "0" output of said flip flop and the input of said first integrator, said diode being poled to be reverse biased when said other of said pair of control signals indicates an in-synchronization condition and forward biased when said other of said pair of control signals indicates an out-of-synchronization condition to reset said first integrator to said reference operating level.

5. A system according to claim 1, wherein
said third means include
a second source of bias voltage,
a first resistor coupled to said second means,
a first operational amplifier having an inverting input coupled to said second source, and an output,
a first capacitor coupled between said output and said inverting input of said first amplifier,
said first amplifier having said reference operating level,
said first resistor and said first capacitor providing said first time constant,
a third source of bias voltage, and
a second operational amplifier having an inverting input coupled to said output of said first amplifier, a non-inverting input coupled to said third source, and an output;
said fourth means includes
a fourth source of bias voltage,
a second resistor coupled to said second means, a third operational amplifier having an inverting input coupled to said second resistor, a non-inverting input coupled to said fourth source, and an output, a second capacitor coupled between said output and said inverting input of said third amplifier, said second resistor and said second capacitor providing said second time constant, a clamp circuit coupled in parallel with said second capacitor, a fifth source of bias voltage, a fourth operational amplifier having an inverting input coupled to said fifth source, a non-inverting input coupled to said output of said third amplifier, and an output, a sixth source of bias voltage, and a fifth operational amplifier having an inverting input coupled to said output of said third amplifier, a non-inverting input coupled to said sixth source, and an output providing said one of said pair of control signals; and said fifth means includes a flip flop having a "1" input coupled to said output of said second amplifier, a "0" input coupled to said output of said fourth amplifier, a "1" output to produce said other of said pair of control signals, and a "0" output, and a diode coupled between said "0" output and said inverting input of said first amplifier, said diode being poled to be reverse biased when said other of said pair of control signals is in said second condition and forward biased when said other of said pair of control signals is in said first condition to reset said first amplifier to said reference operating level.

* * * * *